Patented Oct. 13, 1953

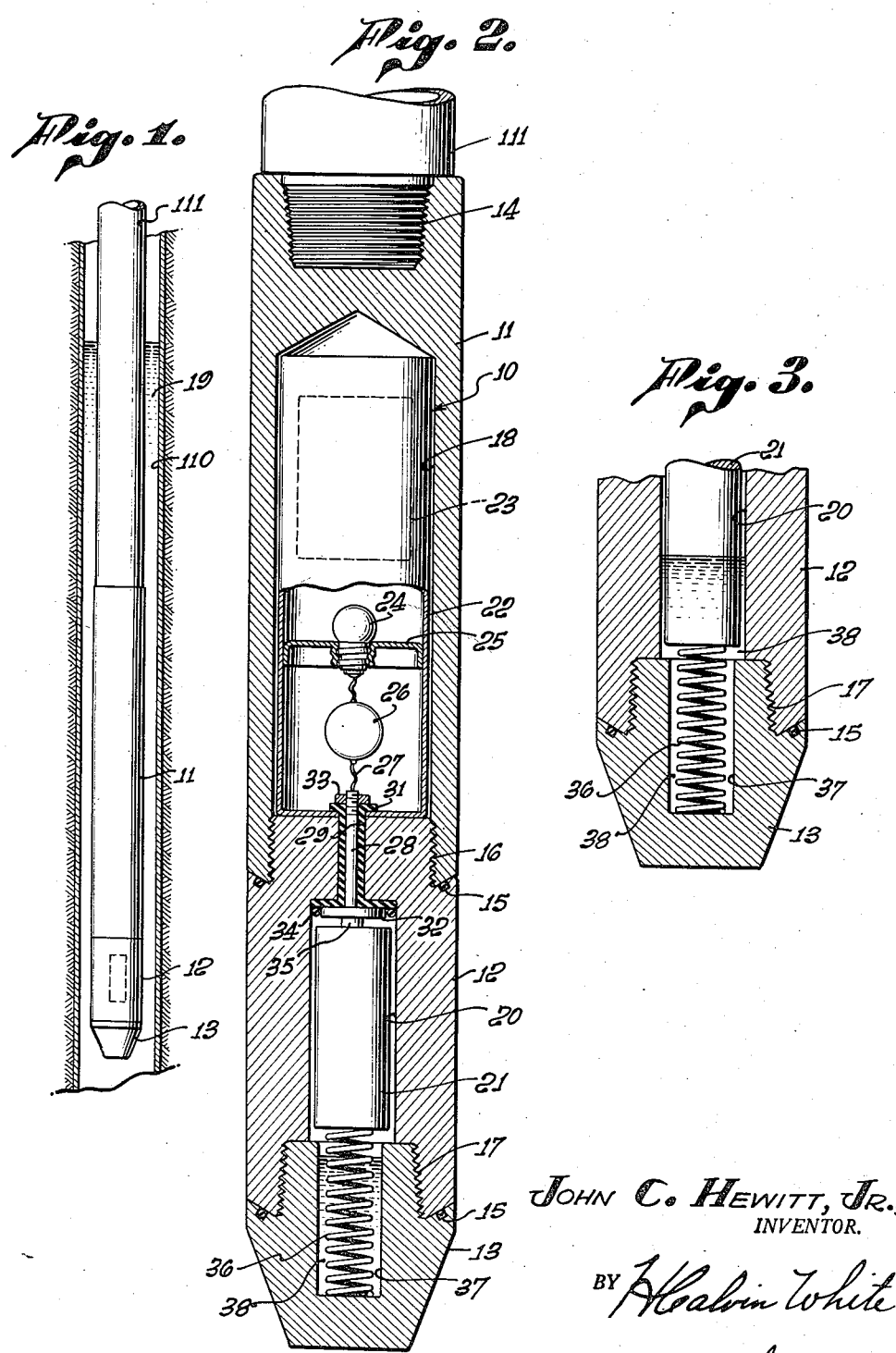

2,654,960

UNITED STATES PATENT OFFICE 2,654,960

WELL INSTRUMENT, INCLUDING PRESSURIZED BATTERY

John C. Hewitt, Long Beach, Calif.

Application July 7, 1952, Serial No. 297,580

13 Claims. (Cl. 33—205.5)

This invention has to do with improvements in battery energized instruments for use in wells at depths where the well temperatures are considerably above atmospheric. More particularly the invention is directed to certain innovations in such instruments whereby it becomes possible to increase the battery efficiency and output, particularly under circumstances which ordinarily are considered to limit or impair the life and efficiency of the battery. The present instruments have been disclosed but not claimed in my copending application No. 93,460, filed May 16, 1949, on Battery Energized Well Instrument, of which this application is a continuation-in-part.

It is to be understood that the invention is generally adaptable to various types and kinds of electrically energized instruments intended to be operated within a well, all of which may be characterized as comprising an element or device electrically energized by current supplied by a battery carried with the device into the well. As an illustrative and preferred embodiment, the invention will be described in conjunction with oil well directional recording instruments of the type employing a fluid tight housing containing an appropriate photographic recorder, and an electrically energizable lamp for illuminating the recording means.

As is known, when an instrument is lowered in a well, particularly a liquid filled well, to a considerable depth, the instrument may be subjected to temperatures above those temperatures at which the ordinarily used batteries can retain their efficiencies. Generally the effect of the higher temperature encountered is to vaporize, dehydrate or otherwise impair the battery electrolyte, with the result that the output and effective life of the battery are seriously reduced. In fact, in some instances such high temperatures exist as to prevent the use of submersed instrument batteries. Heretofore it has been attempted, in order to prevent deterioration of the battery, to isolate the battery from the well liquid temperatures, as by placing the battery in the same sealed housing that contains the lamp or other element to be energized by the battery current. However, the protection afforded the battery in this manner has proven inadequate where the well temperatures reach any very high values.

The invention has for its major objects not only to maintain, but to actually activate the normal current potential of the battery by employing certain concepts directly contrary to the common practices of protecting the batteries in submersed instruments against increases in temperature. Instead of attempting to isolate the battery from temperature conditions in the well, the invention has been developed on the premise of utilizing the effects of high temperatures to maintain and, according to tests, actually increase the battery efficiencies.

It has been found that the potential of a conventional dry cell battery in a well tool may be maintained or increased by subjecting the battery to increasing pressure as it is lowered in a well, even though the temperature of the well liquid is so high that under other conditions, the battery would be impaired. Maintenance or increase of the battery efficiency is believed to result from compression and compaction of its granular components, with resultant increase of the battery potential. This effect may be enhanced by maintenance of the battery as it is compressed in contact with an aqueous or water-containing liquid. Apparently, the water containing liquid serves to supply to the battery any moisture which may be needed, and to prevent the drying of the battery which usually occurs at high temperatures.

Structurally, I subject the battery to the desired pressure by incorporating in the well device a body of liquid which acts upon an increase in temperature to produce an increasing pressure. Thus, as the device is lowered into a superatmospheric temperature zone in a well, the liquid produces an increasing pressure which acts to compact the battery and maintain its efficiency. The liquid may be aqueous, and the battery be exposed directly to either the liquid itself, or its vapor, to thus supply any needed moisture to the battery. Particularly contemplated is an arrangement in which the liquid is contained within a cavity formed in a closure which acts as a removable wall for the battery receiving chamber. Preferably the battery and the lamp or other element energized by the battery are contained respectively within a pair of isolated fluidtight chambers in a single housing.

All the various features and objects of the invention, as well as the details of certain typical embodiments, will be understood more clearly from the following description of the accompanying drawing, in which:

Fig. 1 is a view showing lowered within a well a directional recording instrument embodying the invention;

Fig. 2 is a vertical section through the instrument of Fig. 1; and

Fig. 3 is a fragmentary sectional view illustrating a variation form of the invention.

For the present purposes it will suffice to illustrate generally, as in Figs. 1 and 2, the pertinent structure of a typical directional recording instrument, the light source in which is energized by current from one or more batteries to be maintained under conditions discussed in the foregoing. In use, the instrument is suspended (see Fig. 1) within the heated liquid 19 in a well 110 by a conventional well string 111 or other suspending structure.

The recording instrument proper, generally indicated at 10, is shown to be contained within a protective, pressure resistant body or housing comprising an upper section 11, a vertically intermediate section 12, and a tapered bottom closure section 13. All three of these sections may be formed of steel and have walls of sufficient strength to withstand the relatively great pressures at the bottom of a deep liquid filled well. The upper end of upper section 11 may be appropriately adapted for connection to a lowering cable or pipe string, as by an upper threaded bore 14. The three sections of the housing may be interconnected by threaded joints 16 and 17, which are appropriately sealed, as by O-rings 15.

Upper section 11 contains a vertically extending fluidtight chamber 18, which contains the recording instrument 10, and is isolated against communication with the well liquid 19 about the housing. The lower wall of chamber 18 is formed by section 12 of the housing which contains a second fluidtight chamber or vertical bore 20, isolated from the well liquid and from chamber 19, and containing battery 21.

The instrument 10 contained within the chamber 18 is shown to comprise a case or seal 22 within the upper interior of which may be positioned any known type of directional indicating and photographic recording means, diagrammatically indicated as a unit by the dotted lines 23, which receives light from the electrically energized lamp 24, a grounded lead to which is indicated at 25. Current is supplied to the lamp under control of an appropriate timing device or time control switch, conventionally indicated at 26, electrically connected to the lamp and receiving current through the lead 27.

Current is supplied to the lamp 24 under control of the timing device 26 from the battery 21 located within the bottom chamber 19 of the housing. Current flow is from the battery to the lead 27 through a conductor 28 extending through an insulator sleeve 29, the flanged ends 30 and 31 of which are engaged by head 32 on the lower end of the conductor and a nut 33 threaded onto the upper end of the conductor and taken up to tighten the latter longitudinally within the insulation sleeve. The engagement of the conductor and sleeve may be sufficient to form a pressure-tight seal adapted to prevent fluid flow or pressure communication between chambers 18 and 20, although if required an additional seal may be maintained, as for example by means of an O-ring 34 confined between the head 32 and the wall of bore 20. The battery terminal 35 is pressed against the head 32 by a coil spring 36, which extends downwardly into a recess 37 in bottom closure 13, and engages against the bottom wall of that recess.

The battery 21 may be any suitable type of galvanic or voltaic cell, including the customarily used and so-called dry cell batteries having a self-contained electrolyte functional by virtue of the battery composition, or I may use a silver-chloride magnesium water-activated battery of the type manufactured by the Burgess Battery Company and which is electrically activated by immersion in water or an aqueous liquid. As previously indicated, serious limitations have been placed upon the use of such batteries in wells where the temperature may range around say 250° F. and upward, because of dehydration or other temperature-created impairment of the battery electrolyte. In accordance with the invention, I have discovered that from the standpoint of practical performance of the battery, its potential output may not only be protected, but in a large percentage of instances actually improved, by maintaining the battery under sufficiently high external pressure to subject the battery material or granules to a rather high degree of compaction, and to a pressure sufficient to prevent vaporization of its electrolyte when heated to the temperatures existing at the submersion depth. The resulting compaction tends to reduce the internal resistance of the cell and, as stated, to maintain or increase its life and electrical output. Also where proper protection of performance of the battery requires its maintenance in the presence of moisture or water, provision is made for exposing the battery to moisture or an aqueous liquid while the battery is subjected to compaction.

To achieve these purposes, I provide in the battery chamber 20, and particularly within the portion of that chamber formed by recess 37 of bottom closure 13, a body of liquid 38, which acts to develop an increasing vapor or steam pressure in the portion of the chamber 20 above the liquid level, as the liquid is heated by heat received from the well liquid upon lowering of the device into a well. As will be appreciated, this pressure exerts directly against the battery a compacting force which increases with increasing temperature, and thus counteracts any adverse effect on the battery which the increasing temperature would otherwise have. To attain such a pressure increasing effect, the liquid should have a boiling point which is lower than the boiling point of the battery electrolyte. Also, it is desirable that the liquid be aqueous or water-containing, so that the vapor surrounding the battery will supply moisture to it. Suitable liquids which may be used in the device are:

Ethyl alcohol-water mixture
Prophy alcohol-water mixture
Menthyl alcohol-water mixture
Acetone-water mixture
Water Fig. 2 represents a variational form of the invention which is the same as that of Fig. 1, except that the liquid 38 is filled into the battery chamber to a level such that at all times the liquid itself contacts and supplies moisture to the battery.

I claim:
1. Apparatus for operation within a superatmospheric temperature zone in a well comprising a fluidtight housing to be lowered into the well, a body of liquid in the housing adapted to produce an increasing pressure upon increase in temperature as the housing is lowered into the well, a battery in said housing subjected to said increasing pressure created by the liquid, and an electrically energized element electrically connectible to said battery.

2. Apparatus for operation within a superatmospheric temperature zone in a well comprising a fluidtight housing to be lowered into the well, a fluid in the housing partially in liquid form and adapted to produce an increasing pressure upon increase in temperature as the housing is lowered into the well, a battery in said housing exposed to said fluid and subjected to said pressure thereof, and an electrically energized element electrically connectible to said battery.

3. Apparatus for operation within a superatmospheric temperature zone in a well comprising a fluidtight housing to be lowered into the well, an aqueous fluid in the housing partially in liquid form and adapted to produce an increasing pressure upon increase in temperature as the housing is lowered into the well, a battery in said housing exposed to said fluid and subjected to said pressure thereof, and an electrically energized element electrically connectible to said battery.

4. Apparatus for operation within a superatmospheric temperature zone in a well comprising a fluidtight housing to be lowered into the well, a fluid in the housing partially in liquid form and partially in vapor form and adapted to produce an increasing vapor pressure upon increase in temperature as the housing is lowered into the well, a battery in said housing exposed to the vapor of said fluid and subjected to said pressure thereof, and an electrically energized element electrically connectible to said battery.

5. Apparatus for operation within a superatmospheric temperature zone in a well comprising fluidtight housing means to be lowered into the well, a body of liquid in said housing means adapted to produce an increasing pressure upon increase in temperature as the housing means is lowered into the well, a battery in said housing means subjected to said increasing pressure created by the liquid, and an electrically energized element contained within said fluidtight housing means and electrically connectible to said battery.

6. Apparatus for operation within a superatmospheric temperature zone in a well comprising fluidtight housing means to be lowered into the well containing two fluidtight chambers isolated against fluid flow therebetween, a body of liquid in one of said chambers adapted to produce an increasing pressure upon increase in temperature as the housing means is lowered into the well, a battery in said first chamber subjected to said increasing pressure created by the liquid, and an electrically energized element contained within said second chamber and electrically connectible to said battery.

7. Apparatus for operation within a superatmospheric temperature zone in a well comprising fluidtight housing means to be lowered into the well, a body of liquid in said housing means adapted to produce an increasing pressure upon increase in temperature as the housing means is lowered into the well, a battery in said housing means subjected to said increasing pressure created by the liquid, directional recording means in said housing means, and an electrically energized lamp in the housing means for illuminating said recording means and electrically connectible to said battery.

8. Apparatus for operation within a superatmospheric temperature zone in a well comprising fluidtight housing means to be lowered into the well containing two fluidtight chambers isolated against fluid flow therebetween, a fluid in the housing partially in liquid form and partially in vapor form adapted to produce an increasing pressure upon increase in temperature as the housing means is lowered into the well, a battery in said first chamber exposed to said fluid and subjected to said pressure thereof, and an electrically energized element contained within said second chamber and electrically connectible to said battery.

9. Apparatus for operation within a superatmospheric temperature zone in a well comprising fluidtight housing means to be lowered into the well containing two fluidtight chambers isolated against fluid flow therebetween, a fluid in the housing partially in liquid form and partially in vapor form adapted to produce an increasing pressure upon increase in temperature as the housing means is lowered into the well, a battery in said first chamber exposed to said fluid and subjected to said pressure thereof, directional recording means in said second chamber, and an electrically energized lamp in said second chamber for illuminating said recording means and electrically connectible to said battery.

10. Apparatus for operation within a superatmospheric temperature zone in a well comprising a fluidtight housing to be lowered into the well, a body of liquid in the housing adapted to produce an increasing pressure upon increase in temperature as the housing is lowered into the well, a battery in said housing subjected to said increasing pressure created by the liquid, said housing including an openable closure forming a portion of a wall of the housing and having a recess containing said liquid, and an electrically energized element electrically connectible to said battery.

11. Apparatus for operation within a superatmospheric temperature zone in a well comprising a fluidtight housing to be lowered into the well, a body of liquid in the housing adapted to produce an increasing pressure upon increase in temperature as the housing is lowered into the well, a battery in said housing subjected to said increasing pressure created by the liquid, said housing including an openable closure forming a portion of a wall of the housing and having a recess containing said liquid, a spring within said housing partially received within said closure recess and bearing against said battery, and an electrically energized element electrically connectible to said battery.

12. Apparatus for operation while submerged in heated liquid in a well comprising a vertically elongated fluidtight housing containing upper and lower fluidtight chambers isolated against fluid flow therebetween, an aqueous fluid in said lower chamber partially in liquid form and partially in vapor form and adapted to produce an increasing pressure upon increase in temperature as the housing is lowered into said heated liquid in the well, a battery in said lower chamber exposed to said fluid therein and subjected to said pressure thereof, and an electrically energized element contained within said upper chambers and electrically connectible to said battery.

13. Apparatus for operation while submerged in heated liquid in a well comprising a vertically elongated fluidtight housing containing upper and lower fluidtight chambers isolated against fluid flow therebetween, an aqueous fluid in said lower chamber partially in liquid form and partially in vapor form and adapted to produce an increasing pressure upon increase in temperature as the housing is lowered into said heated liquid in the well, a battery in said lower chamber exposed to said fluid therein and subjected to said pressure thereof, said housing including a bottom removable closure forming a bottom wall of said bottom chamber and having an upper recess containing the portion of said aqueous fluid which is in liquid form, directional indicating means contained within said upper chamber, and an electrically energized lamp contained within said upper chamber for illuminating said recording means and electrically connectible to said battery, and a conductor extending between said upper and lower chambers for electrically connecting said battery and lamp.

JOHN C. HEWITT.

No references cited.